Aug. 15, 1939.   R. W. KEELER   2,169,916
ROAD BUILDING MACHINE
Original Filed June 21, 1933    11 Sheets-Sheet 1
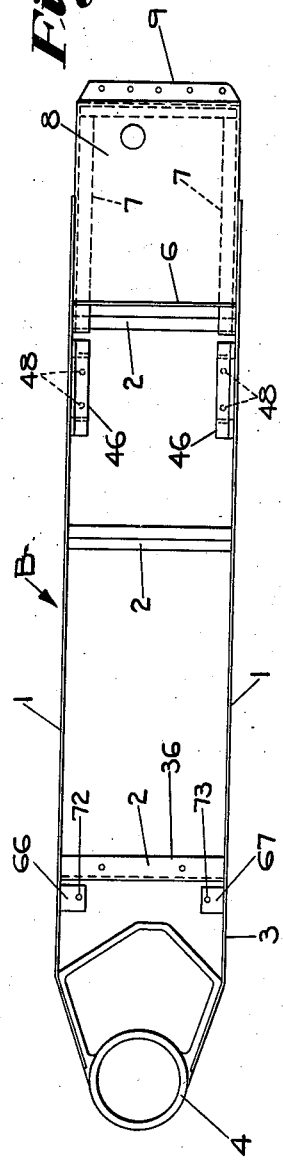
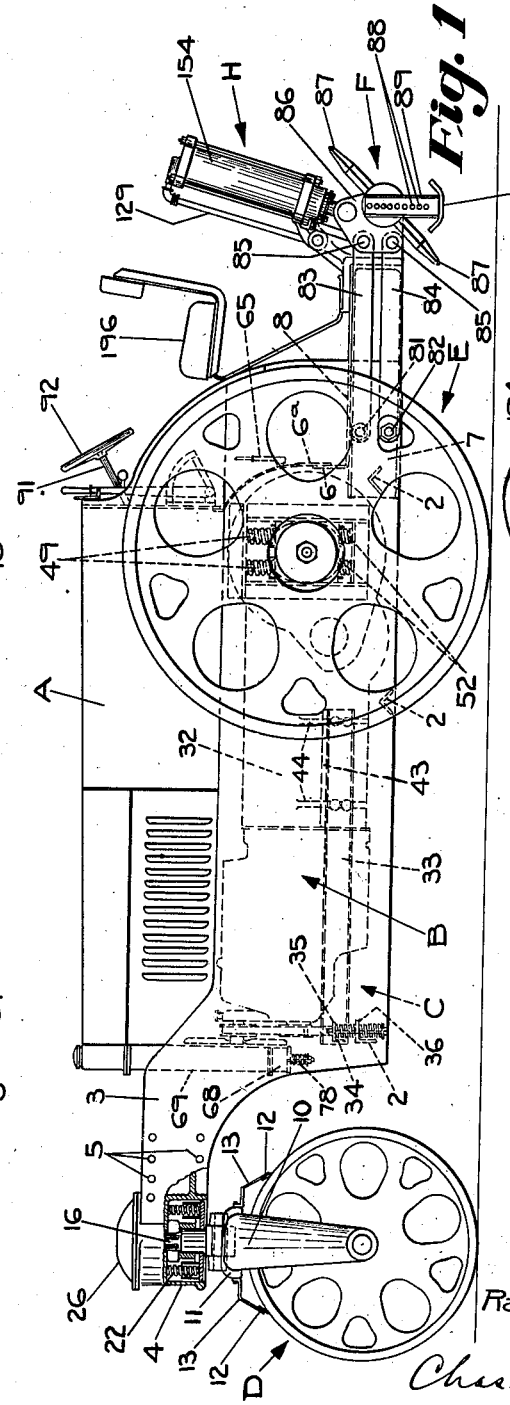
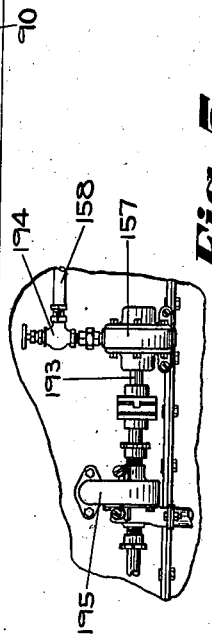
INVENTOR:
Raymond W. Keeler,
BY
Chas. M. Nissen,
ATTY.

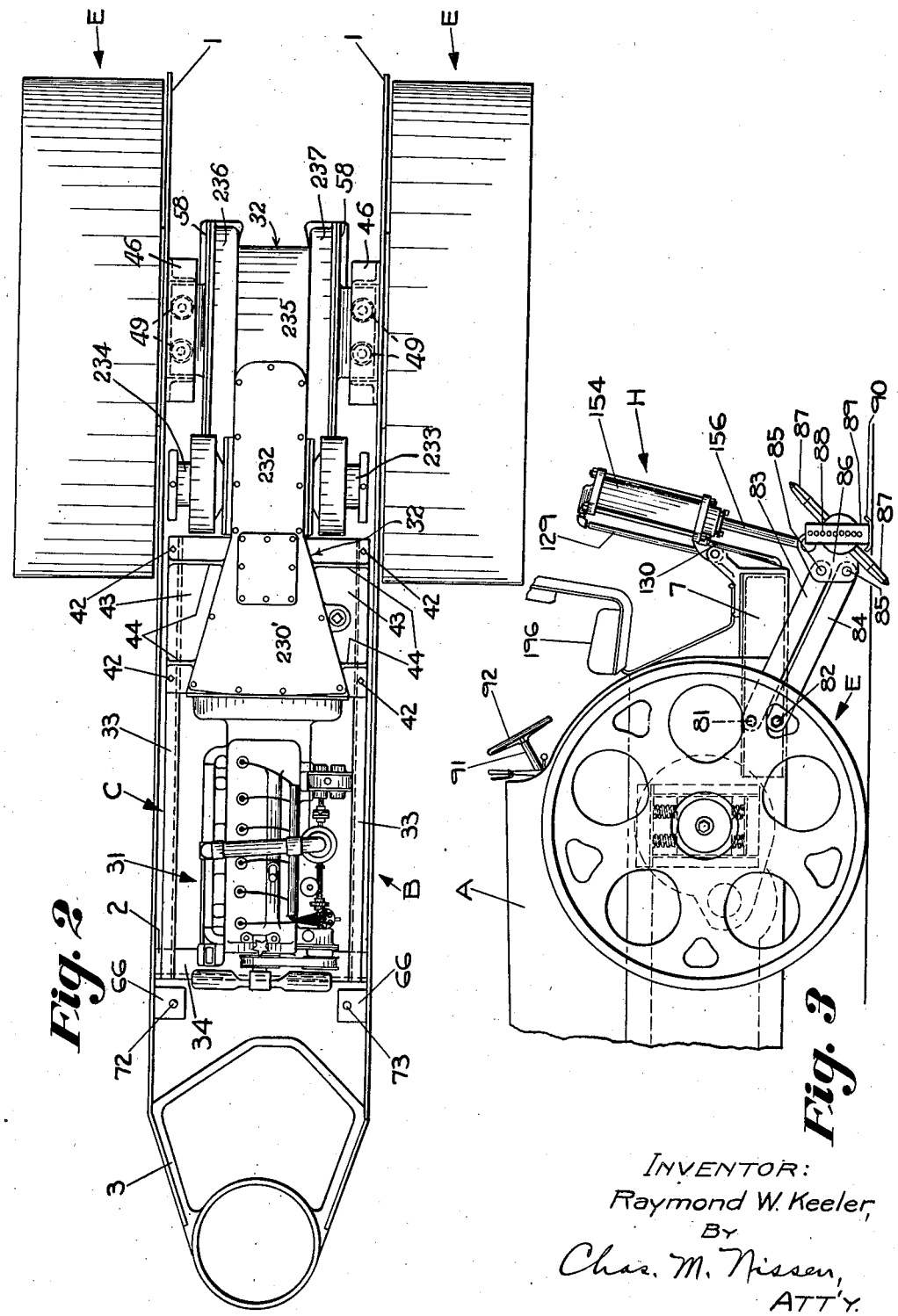

Aug. 15, 1939.  R. W. KEELER  2,169,916
ROAD BUILDING MACHINE
Original Filed June 21, 1933  11 Sheets-Sheet 3

INVENTOR:
Raymond W. Keeler,
BY
Chas. M. Nissen,
ATT'Y.

Aug. 15, 1939.   R. W. KEELER   2,169,916
ROAD BUILDING MACHINE
Original Filed June 21, 1933   11 Sheets-Sheet 4

INVENTOR:
Raymond W. Keeler,
By
Chas. M. Nissen,
ATT'Y.

Aug. 15, 1939.     R. W. KEELER     2,169,916
ROAD BUILDING MACHINE
Original Filed June 21, 1933     11 Sheets-Sheet 5
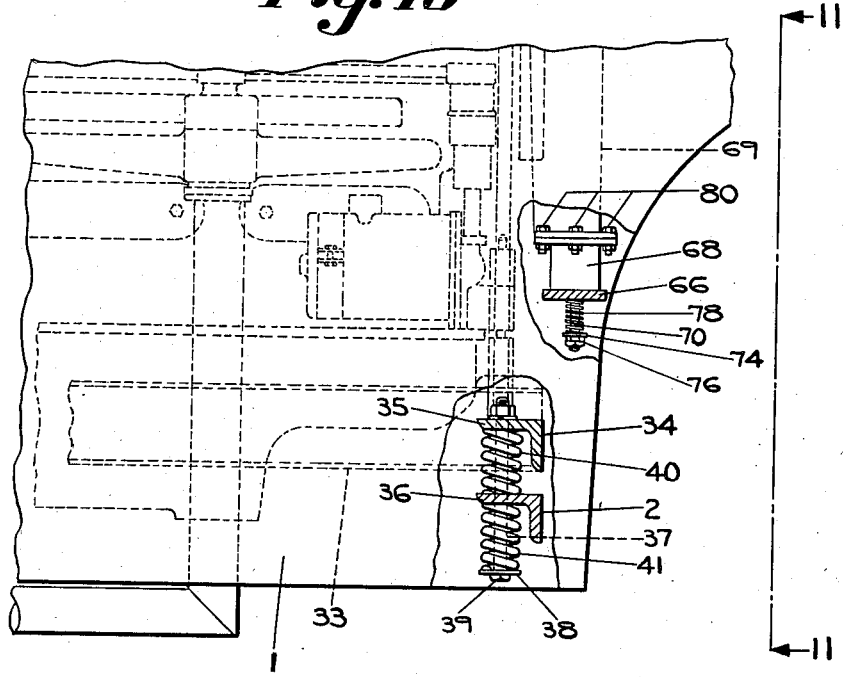
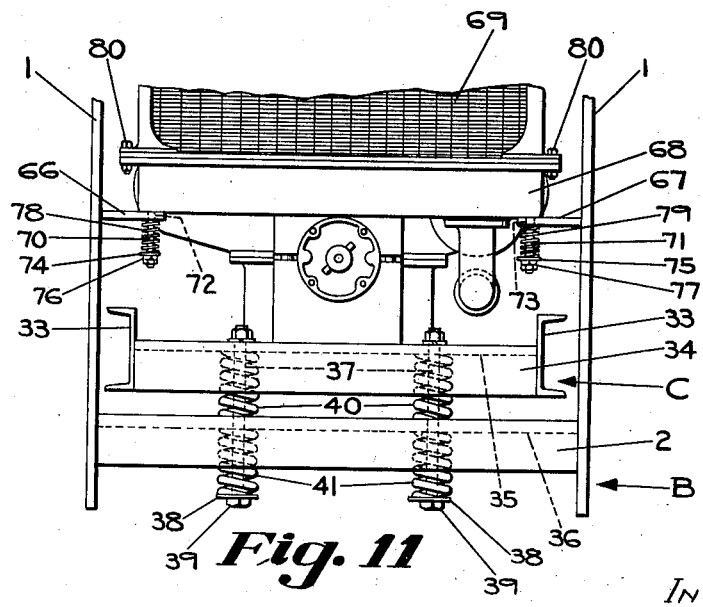
INVENTOR:
Raymond W. Keeler,
BY
Chas. M. Nissen,
ATTY.

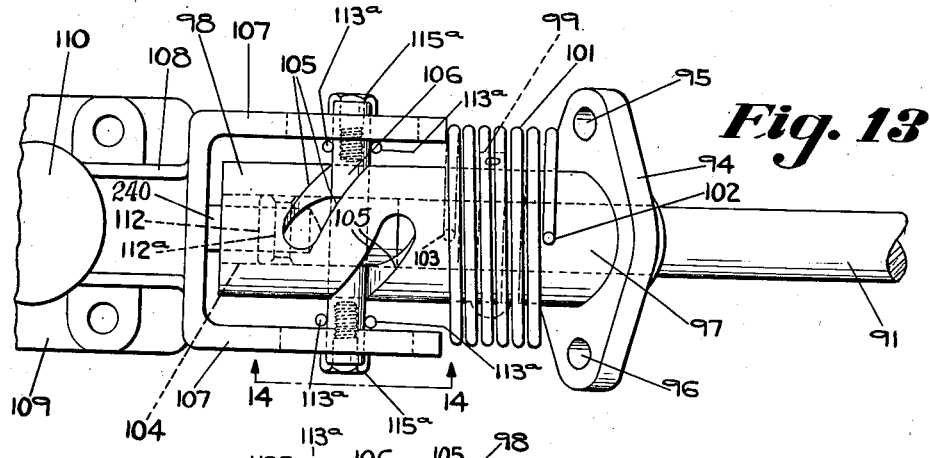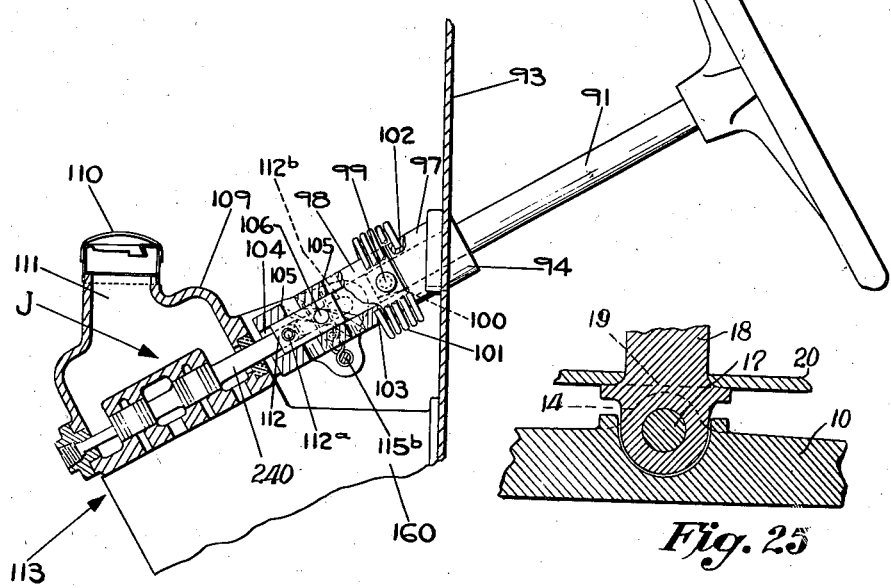

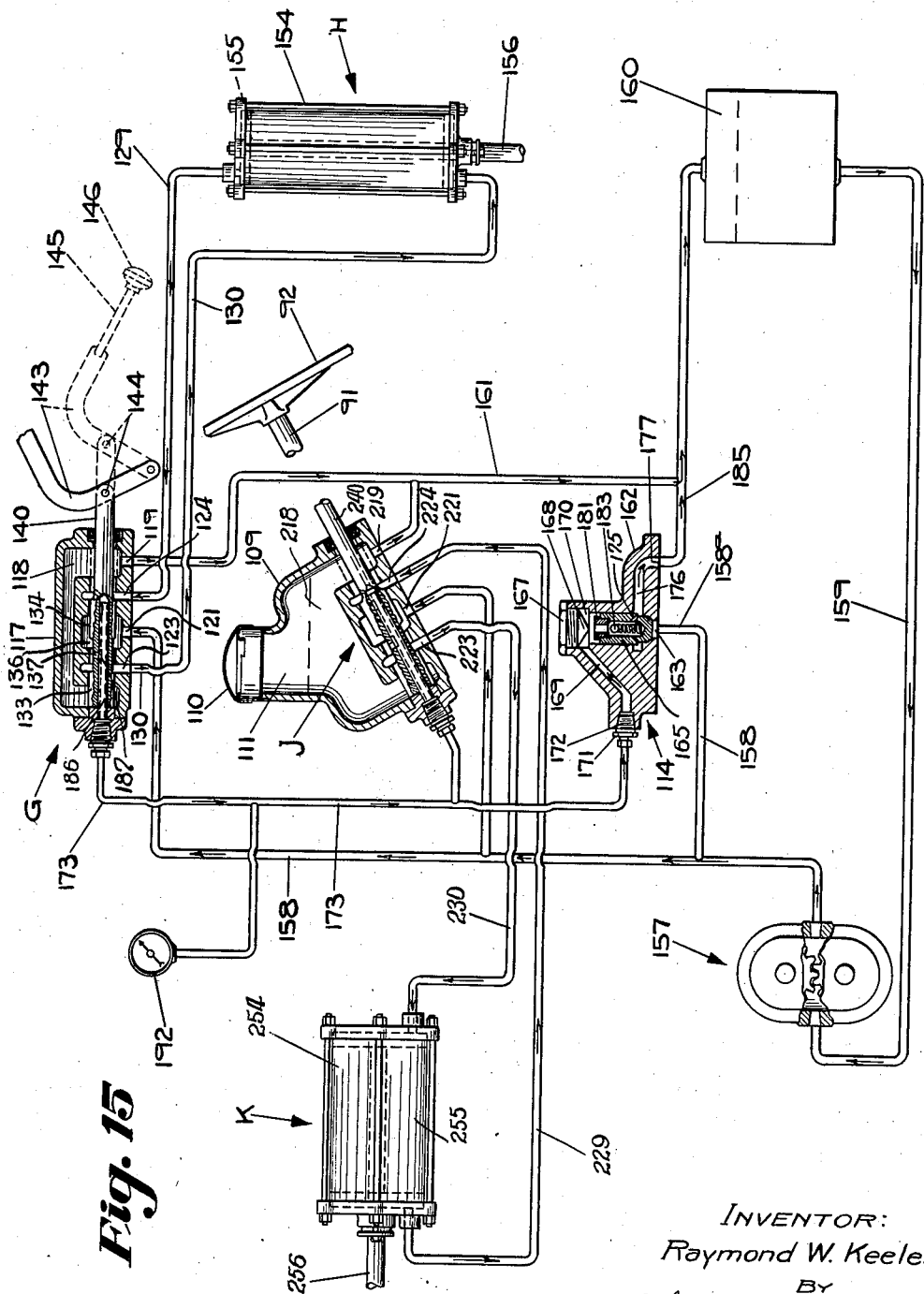

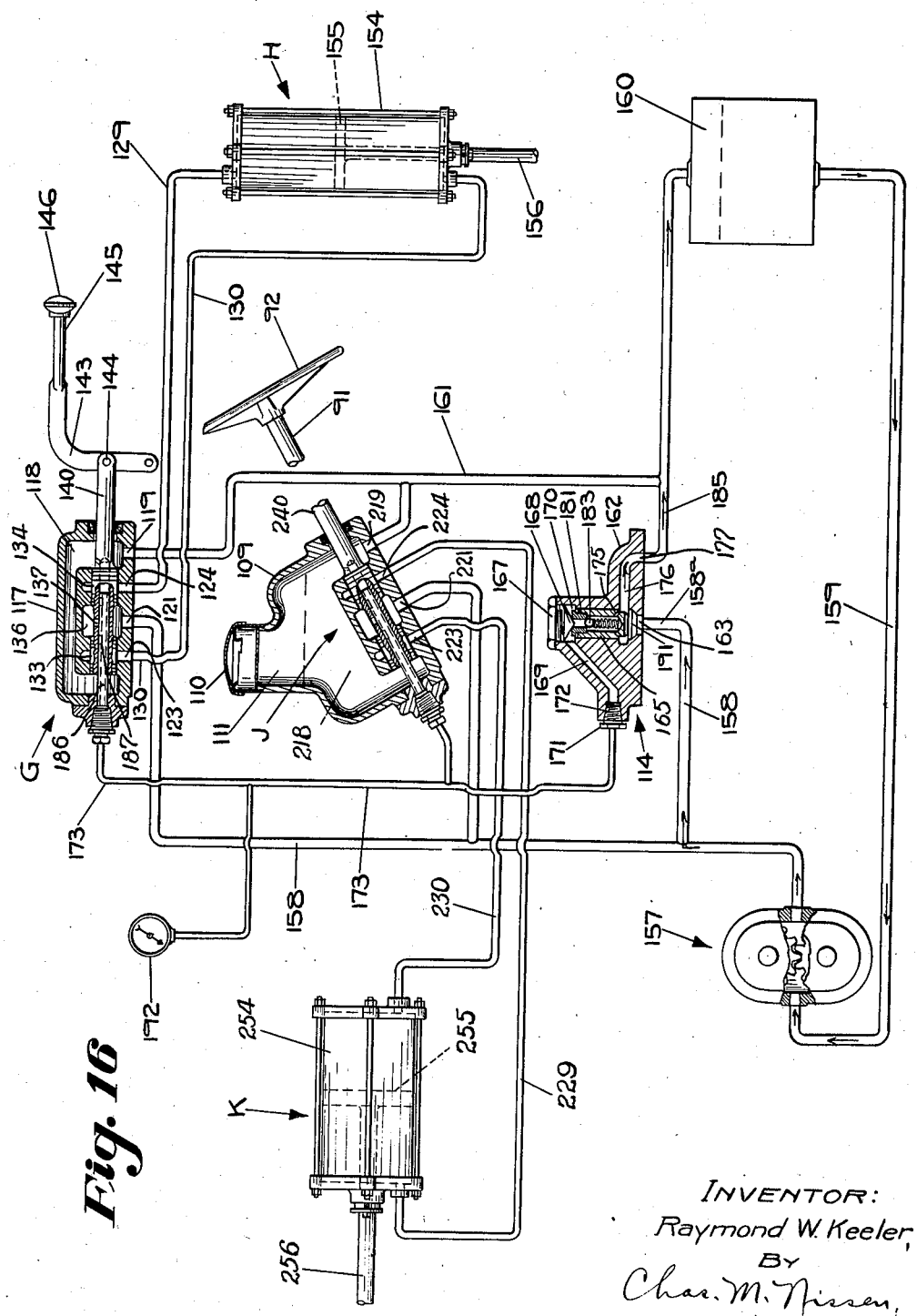

Aug. 15, 1939.   R. W. KEELER   2,169,916
ROAD BUILDING MACHINE
Original Filed June 21, 1933    11 Sheets-Sheet 9
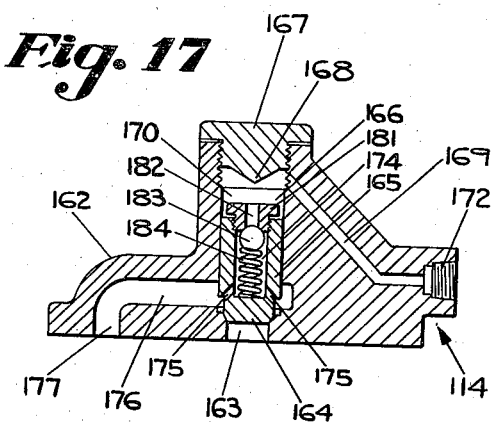
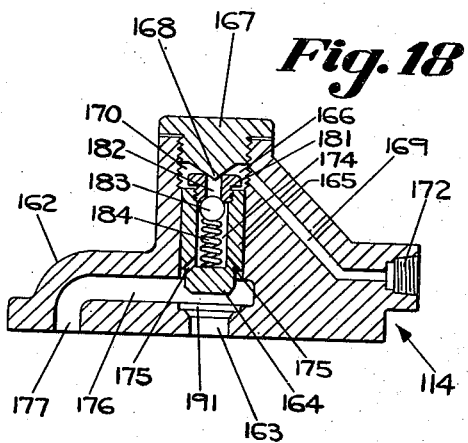
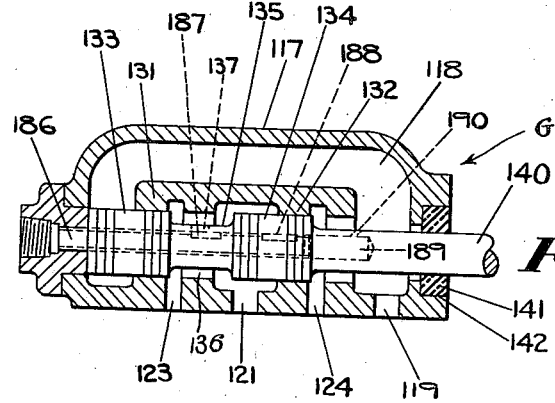
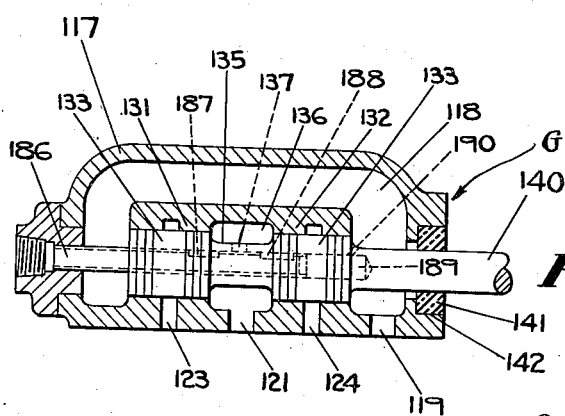
INVENTOR:
Raymond W. Keeler,
BY
Chas. M. Nissen,
ATT'Y.

Aug. 15, 1939.   R. W. KEELER   2,169,916
ROAD BUILDING MACHINE
Original Filed June 21, 1933   11 Sheets-Sheet 10

INVENTOR:
Raymond W. Keeler,
BY
Chas. M. Nissen,
ATT'Y.

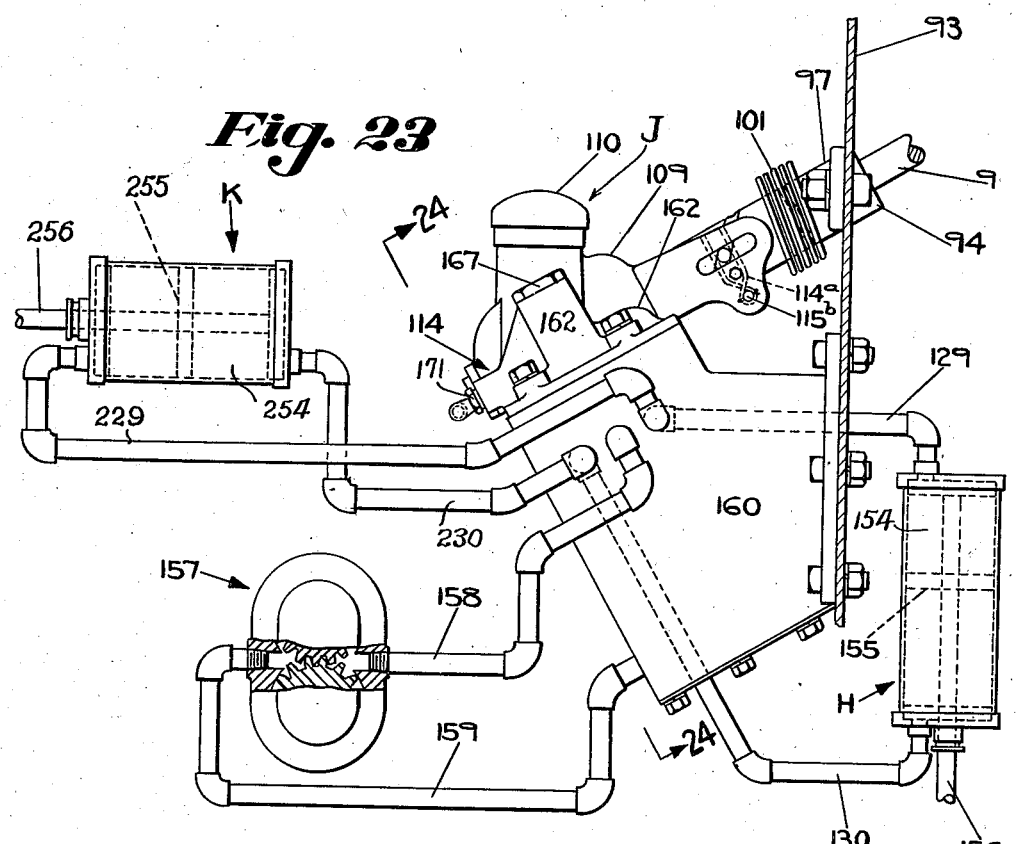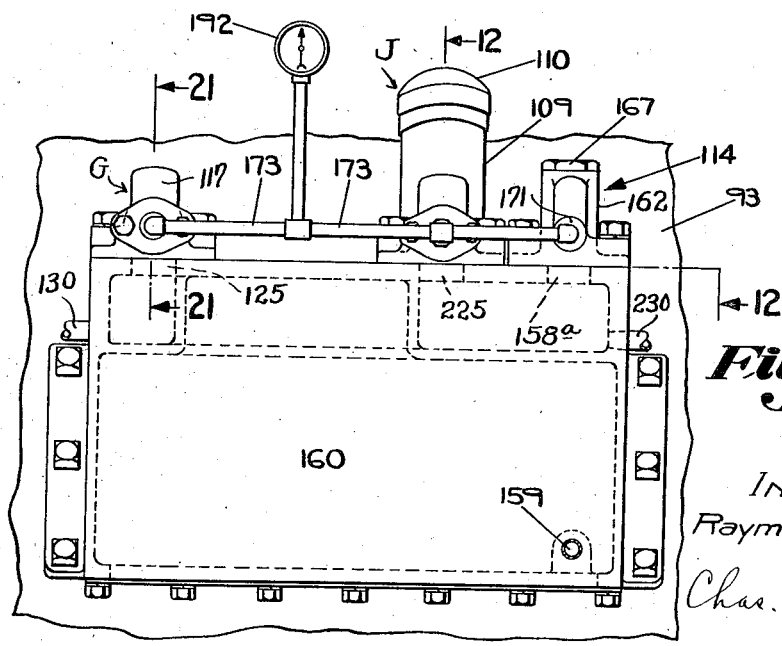

Patented Aug. 15, 1939

2,169,916

UNITED STATES PATENT OFFICE 2,169,916

ROAD BUILDING MACHINE

Raymond W. Keeler, Galion, Ohio, assignor to The Galion Iron Works and Manufacturing Company, a corporation of Ohio Application June 21, 1933, Serial No. 676,906
Renewed July 22, 1938

42 Claims. (Cl. 180—1)

In paving operations, the use of power operated rolling machines for the final leveling and compacting of the pavement, is employed universally. These machines embrace, usually, three rollers upon which the driving mechanism is carried, which mechanism includes a power plant for driving the roller and power transmission devices interconnecting the power plant and drive rollers of the machine. The power plant, of course, is mounted on, and interconnected with, the frame of the machine, and in conventional practice in roller design and construction, the power plant has been rigidly connected with the frame. This feature results in the subjection of these parts to severe strains during operation of the roller with consequent frequent breakage of the parts.

Furthermore, the conventional type of roller is cumbersome and unwieldy to operate, being slow in speed, difficult to handle and manipulate, and hard to steer, all of which represent an expenditure of excessive energy by the operator and loss of efficiency.

The above indicated objections, together with others, are avoided by the present improved construction, which is especially designed to relieve operating strains on the power plant and transmission mechanism, to provide great ease in steering; to reduce the space required for turning the entire machine around; to increase the traction speed; and to arrange the control instrumentalities so that they will be conveniently accessible to a single operator riding upon the machine.

Other advantages of the present improved construction will become apparent as the description proceeds.

The above desired objects are accomplished, in general, by mounting the front rolls and yoke on a spring supported king pin and also spring-mounting the power plant and transmission, which are protected from strain, excessive wear and breakage, by a heavy channel sub-frame and which, when assembled in the machine, float between supporting and rebound springs.

Furthermore, the previous practice of mounting front rolls on plain bushings resulted in constant and rapid wear on the inner edges of roll rims, hubs and yoke. It was necessary, therefore, to replace bushings and axle frequently, and to shim between hubs and yoke to maintain the proper clearance between the rolls.

In the present construction, the front rolls float on large adjustable roller bearings thus rendering it possible to assemble these front rolls with only five thousandths of an inch clearance, which is constantly maintained between the rims of the front rolls. This eliminates all wear on yoke, roll hubs and inner edges of roll rims. The front yoke is secured to the king pin by a swivel joint, the movement of which is suitably limited so that the cramping of the yoke against the frame in turning on very uneven ground, is prevented, and the king pin itself is spring mounted, which cushions the shocks of high speed operation on rough surfaces.

In the present machine, the master clutch lever, the forward and reverse clutch lever, the hand brake lever, the gear shift lever, the differential lock lever, the scarifier lever, together with the engine controls and indicating dials are located in close proximity to the steering wheel, within easy reach of the operator without requiring him to leave his seat. The steering mechanism is hydraulically operated, there being a very large and powerful hydraulic cylinder located in the king pin head casting at the front of the frame, the piston rod of this cylinder being directly connected to a steering arm which is splined to the top of the king pin and permits free movement of the spring mounted king pin. Flow of oil to the steering cylinder is through a piston type valve, and only a slight turn either way is necessary to open the valve. The steering device is powerful enough to turn the front rolls even when standing still and in soft material. The action of the steering device is quick and maximum movement of the front roll is secured for turning without delay or effort on the part of the operator, the steering being accomplishable by virtually the use of only one finger.

It may be noted in passing that the present roller will turn in a thirty-three foot circle, or will turn in an eighteen foot roadway by backing once. This is accomplishable through the provision of a very short wheel base together with the rapid steering device which enables the operator to get the full benefit of the extreme turning range of the front roll quickly and without effort. The turning range of the front roll which covers a one hundred degree arc is made possible by a high arched and under cut design of the front end of the frame member.

The construction of the improved roller will be understood from a consideration of the following description when taken in conjunction with the accompanying drawings, in which:

Fig. 1 is a side elevation of an improved machine embracing the principles of the present invention, certain parts being broken away and shown in section, for clarity;

Fig. 2 is a plan view of the machine, the forward roller and mounting thereof, as well as a number of other ports, being omitted;

Fig. 3 is a fragmentary side elevational view, showing the mounting of the drive rollers and scarifying device, the latter being in operative position;

Fig. 4 is a plan view of the main frame of the machine;

Fig. 5 is a fragmentary view in elevation, of the pump mechanism for operating the hydraulic mechanism employed in the construction;

Fig. 10 is a fragmentary elevational view with parts broken away showing the front spring mounting of a supplemental or chassis frame carrying the source of power and transmission mechanism and a radiator support;

Fig. 11 is a fragmentary elevational view of the front portion of the machine, showing the mounting of the radiator and chassis frame elements with respect to the main frame, the view being taken on the plane 11—11 of Fig. 10;

Fig. 12 is a view partly in elevation and partly in section, showing certain features of the steering mechanism;

Fig. 13 is a detail plan view, of a portion of the mechanism of Fig. 12;

Fig. 14 is a fragmentary elevational view of parts of the mechanism of Fig. 13, on the plane 14—14 of Fig. 13;

Fig. 15 is a diagrammatic view of the hydraulic steering and scarifier control mechanism, showing the mechanism in open or operating position;

Fig. 16 is a view similar to Fig. 15 but showing the mechanism in closed or no-load position;

Fig. 17 is an enlarged detail sectional elevational view of a pressure regulating unit shown in Figs. 15 and 16, the valve of which is in closed position, as illustrated in Fig. 15;

Fig. 18 is a view similar to Fig. 17, but showing the valve in open position as illustrated in Fig. 16;

Fig. 19 is an enlarged detail sectional elevational view of one of the slide valves shown in Figs. 15 and 16, the valve being shown in one open or operating position;

Fig. 20 is a view similar to Fig. 19, showing the valve in closed position;

Fig. 23 is a side elevation of the hydraulic mechanism showing diagrammatically the interconnections between the respective parts thereof;

Fig. 24 is a front view taken on the plane of the line 24—24 of Fig. 23; and

Fig. 25 is an enlarged fragmental sectional view taken on the line 25—25 of Fig. 8.

Figure 6:
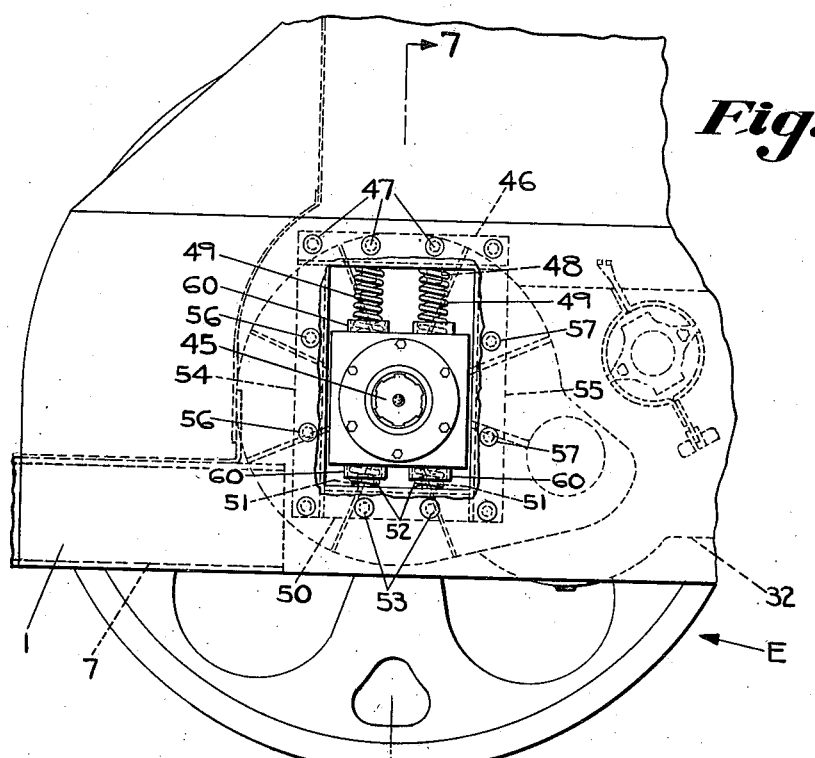
Fig. 6 is a detail fragmentary side elevational view, with parts removed, showing the mounting of the rear axle.

Referring more particularly to the drawings, the improved machine comprises, in general, a body A, a main frame B, a supplemental or chassis frame C, a front roller D and traction rollers E. The main frame B may carry a scarifying device F, should such be desired.

The invention has for one of its principal features, the mounting upon the frame B of the various instrumentalities forming the complete structure, it being recalled that it has been indicated already that the parts are, in effect, resiliently or floatingly mounted.

Referring first to the structure of the frame B, it will be seen by reference to Figs. 1 and 4 that this frame comprises side plates 1, held in braced, spaced-apart relation by transversely extending angle bars 2. These plates 1 are formed, desirably of one piece steel boiler plate, of about one-half inch in thickness, although this is not material to the essence of the invention.

At what is to be the forward end of the frame, the plates 1 are formed with vertically off-set portions 3, which converge and which are joined by a heavy casting 4 to which the sides 3 are rigidly held by hot driven rivets 5. The angle bars 2 are welded to the plates 1. At the rear, the side plates 1 have mounted thereon a platform 8 having a front flange 6 for attachment of guard 6ª. There are welded to the plates 1 at the rear thereof, the longitudinally extending channels 7, upon which channels the operator's platform 8 is welded. Welded across the rear of the frame is a heavy drawbar 9, which serves as an additional frame brace.

Figure 8:
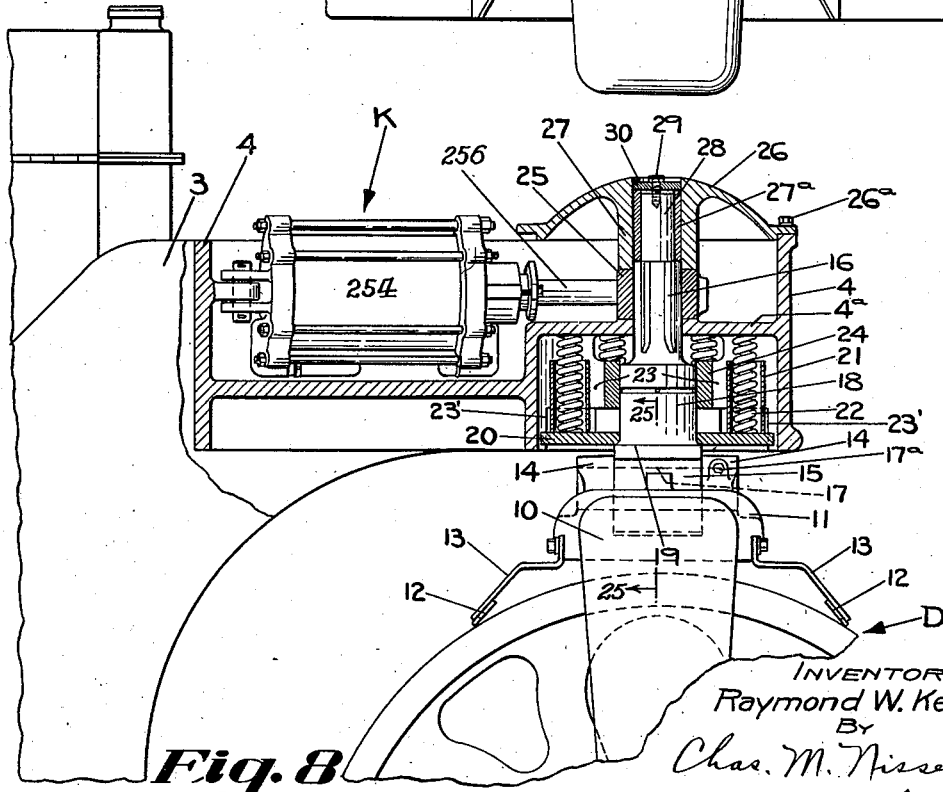
Fig. 8 is a fragmentary view, partly in section and partly in elevation, of the mounting of the king pin of the forward roller.

The casting 4 serves as a housing for the mounting for the king pin of the roller D. The details of this mounting are shown, for example, in Figs. 1, 8 and 25. It will be seen that the roller D is provided with the usual yoke 10, having an enlarged central portion 11 carrying scrapers 12 mounted on spring arms 13. Positioned on and integral with the portion 11 are bosses or straps 14 between which extends the enlarged end 15 of the king pin 16, the end 15 of the king pin being secured in position by a pin 17 passing therethrough and also through the bosses 14, upon which pin 17 the roller D is adapted to rock in a vertical plane. The pin 17 is secured in the bosses 14 by a key bolt 17ª.

The king pin of the roller is reduced in diameter as indicated at 18, there being thereby formed an annular shoulder 19 between the enlarged end part 15 and part 18, this shoulder 19 serving as an abutment for the plate 20, which is centrally apertured for receiving the part 18 of the king pin, the plate 20 allowing free movement of the king pin relative to the casting 4, the engagement of which plate 20 with the abutment 19 forms part of a resilient mounting for the roller D, as will now be described. Welded to the plate 20 is a plurality of cup members 21 in which are positioned springs 22 compressed between the plate 20 and the top wall 4ª of the casting 4. These springs continuously urge the plate 20 against the king pin abutment 19, and it will be apparent that they form a cushion mounting for the roller D during vertical movements thereof.

Integral with the casting 4 and extending interiorly thereof and downwardly from top wall 4ª and inwardly from the side walls are ribs 23, which have bottom extensions 23' which fit into notches in the periphery of the plate 20 for guiding the plate 20 in its vertical movements. These ribs 23 are rigidly attached to a ring 24 which defines a bearing for the portion 18 of the king pin 16.

The top wall 4ᵃ of the housing is apertured to receive the end portion of the king pin 16, to which end portion is splined the actuating lever 25, which is operated by instrumentalities to be described later. The king pin 16 and lever 25 are protected by a cap 26, having an internally projecting bearing 27 for the end 28 of the king pin. The cap 26 is secured to the casting 4 by cap screws 26ᵃ. A washer 30, secured to king pin end 28 by cap screw 29, retains a bushing 27ᵃ to said king pin for vertical movement therewith in the bearing 27 of cap 26.

The frame B, described above, serves also as an enclosure and protection for the engine and transmission. These parts are mounted directly upon the supplemental or chassis frame C. Fig. 2 is illustrative of the disposition of these parts, the engine being indicated generally at 31 and the transmission being contained within a housing formed by casting 32 mounted on the chassis frame C, rearwardly of the engine. The front end of the chassis frame C is resiliently supported on the frame B, and includes the side channel bars 33 (Figs. 1, 2, 10 and 11) and end angle bar 34. Rearwardly, the transmission housing 32 extends over the rear axles which of course, pass therethrough in operative association with the transmission mechanism in the housing. The rear axles of the machine, therefore, form the rear support for the chassis frame C as will be hereafter described.

As will be seen from Figs. 1, 10 and 11, the end angle bar 34 of the chassis frame C and the end angle bar 2 of the frame B are disposed with their respective flanges 35 and 36 extending rearwardly. For mounting the chassis frame C, there are employed tie rods 37 threaded on the end for the reception of washers 38 and nuts 39 when the structures are assembled. The flanges 35 and 36 of the respective angle bars are provided with registering holes through which the tie rods are adapted to pass. The front end of the chassis frame C is therefore mounted on the angle 2 through the tie rods, there being positioned around these tie rods the coil springs 40 which bear against the under surface of the flange 35 of the angle bar 34 of the chassis frame C and the upper surface of the flange 36 of the angle bar 2 of the frame B. There are provided also the coil springs 41 bearing against the under surface of the flange 36 and the washers 38. These springs cushion the front end of the chassis frame C and hold it in floating relation with the frame B thereby permitting both lateral and longitudinal movement between said frames B and C to a limited extent.

Figure 7:
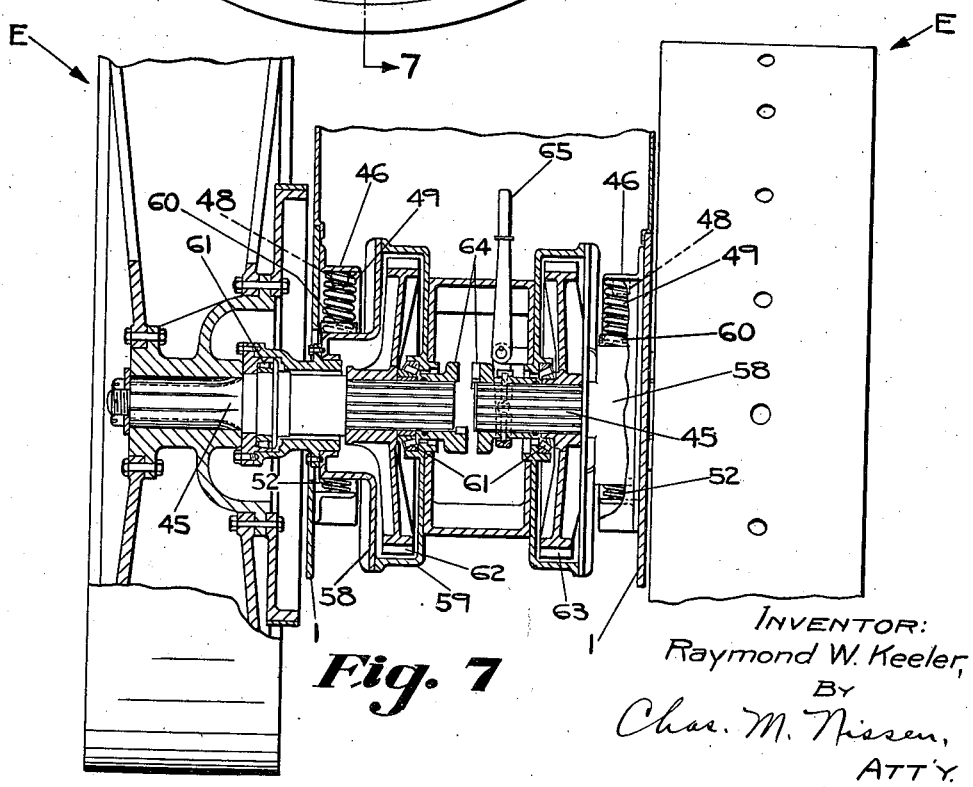
Fig. 7 is a sectional view on the line 7—7 of Fig. 6.

The engine 31 and transmission mechanism are interconnected, the transmission mechanism being located in the housing or casting 32. The housing or casting 32 is a unitary structure and is rigidly bolted to the side channels 33 of the chassis frame C, by bolts 42, extending through openings in the integral side flanges 43 on each side of said housing 32, which flanges are provided with reinforcing webs or ribs 44 to afford additional supporting and strengthening means. Said flanges 43 are bolted to said side channels 33 near the rear portion of the said channels. Said housing therefore constitutes a continuation of the chassis frame C. Within the forward portion 230' of said housing 32 is housed a master clutch mechanism and the usual transmission gears. Within the central portion 232 of said housing 32 is housed the usual differential mechanism which drives a pair of laterally extending stud shafts having pinion gears cooperating with the individual bull gears 62 and 63 (Fig. 7). Extending laterally of the central portion 232 is a pair of clutches 233 and 234. Operation of one of said clutches is effective to cause forward motion of the machine while action of the other is effective to cause rearward motion thereof.

The rear portion 235 of said housing 32 provides a housing within which a clutch 64 (Fig. 7) is mounted. This portion 235 of the housing 32 also has rigidly connected thereto a pair of side castings 236 and 237 provided with individual covers 58 (Figs. 2 and 7) which resiliently support the rear portion of the frame B as hereinafter described.

The resilient connection of the casting 32 of the chassis frame C, near the rear thereof with respect to the rear portion of the main frame B, as will be next described, when taken with the resilient mounting of the front end of the chassis frame C, will afford a flexible connection between the main frame B, which is directly supported by the front roller D, and the chassis frame C, which is directly supported by the rear rollers E. That is, the support of the rear portion of the main frame B is by virtue of its connection with chassis frame C, and the support of the front portion of chassis frame C is by virtue of its connection with main frame B. A complete floating connection between the two sections of the supporting frame, as well as between the engine and transmission and the main frame B, is thereby provided.

The details of this rear mounting are shown in various figures of the drawings, such for example as illustrated in Figs. 1, 4, 6 and 7. The frame B is apertured for the passage of the rear axle members 45, 45, and is provided with the upper angles 46, which are riveted to the frame, as indicated at 47. Upon these angles 46 are depending bosses 48 for receiving the coil springs 49. Corresponding bottom angles 50 are also provided, which have the upstanding bosses 51 for receiving the coil springs 52. The angles 50 are riveted to the frame B, as indicated at 53. Corresponding vertical angles 54 and 55, riveted at 56 and 57 respectively, complete a box-like receiver on the inner surface of each side of the frame B, for the covers 58 of the bull gear housings 59. The covers 58 are provided with spring receiving bosses 60 for receiving and supporting the supporting and rebound springs 49 and 52, these springs cushioning all shocks and completing the floating mounting of the main frame B. It is therefore evident that springs 40, 41 and 49, 52 cooperate to provide a full floating relation between the frames B and C. This provides for both longitudinal and lateral tilting of said frames B and C relative to each other to limited extents, thereby prevent frame distortion when the rollers D and E are on very uneven ground. The pivotal connection afforded by pin 17 and the spring mounting of main frame B afforded by springs 22 at the forward end thereof and springs 49, 52 at its rear end also provide a complete spring mounting for the main frame B relative to rollers D and E. As will be seen from Fig. 7, the rear axles 45 are carried on adjustable bearings 61, and the bull gears 62 and 63 are splined on the axles 45. The bull gears 62 and 63 are driven from individual pinion gears which pinion gears are operated from the usual differential mechanism, thus providing for unequal turning of roller wheels E when the machine is making a turn. To provide for movement of the wheels E in unison which may be desirable if one of the wheels E is on a slippery ground or is otherwise unable to gain a driving friction connection with the ground, a clutch 64, actuated by lever 65, is provided. By engaging the two sections of clutch member 64, the differential mechanism is effectively locked out and slipping of one wheel is prevented, due to the direct connection between axles 45.

From Figs. 10 and 11, it will be seen that upon inwardly extending flanges 66 and 67 welded to the front end of the side plates 1 of the frame B, is mounted the flanged bar or bottom radiator tank 68 carrying the radiator 69 for the motor. The mounting of the tank 68 upon the flanges 66 and 67 is accomplished by means of studs 70 and 71 secured to the bottom of the tank 68 and passing through holes 72 and 73 in these flanges. The studs are provided with washers 74 and 75, held in position by nuts 76 and 77. The studs 70 and 71 support the springs 78 and 79 which bear against the aforesaid washers and the under surface of the flanges. Bolts 80 secure the radiator in position.

It will therefore be seen that the various parts of the roller mechanism are effectively cushioned against all shocks.

Before passing to the consideration of the steering mechanism for the roller, attention is called to the fact that a scarifying device may be attached to the machine, for the purpose of digging up road surfaces, as for example, where worn surfaces are to be replaced. In such circumstances, the machine is used only as a tractor for pulling the scarifier through the road material, and it will be understood that, in practice, this scarifier is an optional provision.

The channel members 7 are secured to the frame B to project rearwardly thereof on each side of the frame. Pivotally connected to each channel at 81, and at 82, are the parallel bars 83 and 84, the pivotal connection being at one end of each bar, which is mounted for free turning therearound. The other ends of the bars are pivotally connected, as at 85, to plates 86, which suitably carry the scarifying teeth 87 mounted to cut at an angle of substantially 45 degrees. The depth of cut is regulated by adjusting the scarifiers 87 relative to the series of holes 88 provided in standards 89, each of which is carried by a sliding shoe 90 which is adapted to travel along the road surface. When in operative position, the scarifiers 87 are pressed into the roadway surface by hydraulic instrumentalities, which will be described in detail hereinafter. These hydraulic instrumentalities are also employed to lift the scarifiers out of engagement with the road surface, and when lifted to inoperative position, the parallel bars 83 and 84 maintain the scarifiers always at the same angle in which they engage the road surface, so that the proper cutting angle is continuously assured.

The steering mechanism for the machine includes the steering post 91, operated by turning the steering wheel 92. Operation of the steering wheel 92 actuates a piston valve in the hydraulic steering mechanism in a manner to be later described in detail. The steering post 91 passes through the dash 93 of the machine, being secured thereto by a collar 94 provided with suitable holes 95 and 96 for the reception of attaching instrumentalities of a suitable kind, not shown. A sleeve section 97 integral with collar 94 forms a bearing for steering post 91. A second sleeve section 98 is attached by a pin 99 to the end 100 of the steering post, the sections 97 and 98 being interconnected with a spiral spring 101, one end of which is secured to the section 97 at 102, and the other end to the section 98 at 103. The section 98 is bored through its length, as indicated at 104, and is provided with spiral slots or openings providing cams 105, through which openings is passed a pin 106, extending through the arms 107 of yoke 108 which extends from casting 109, which houses the hydraulic steering valve J to be later described. Housing 109 is provided with a removable fill cap 110, closing the opening 111, through which the hydraulic system is filled with fluid. The housing 109 is mounted on the manifold 113 which in turn is mounted on the dash 93 of the machine. The manifold 113 and the supply tank 160 are preferably integral, as will be apparent from Figs. 12, 21 and 22.

The hydraulic valve stem 240 enters the sleeve 98 and is pinned, as indicated at 112$^a$, to a slide piston 112 which is fitted in the bore 104 of the sleeve 98 for a sliding fit therein. A pin 106 is passed through the slots 112$^b$ in the arms 107 and also through the spiral slots forming cams 105 in the sleeve 98 and has a snug fit through the piston 112. As the sleeve 98 is turned responsive to turning of the steering wheel 92, the action of the spiral cams 105 on the pin 106 is such as to cause the pin 106 to move rectilinearly in the slots 112$^b$, thus operating the valve J and correspondingly steering the entire machine, as hereinafter described. The pin 106 acts between the arms 113$^a$ of U-shaped springs 114$^a$ (see especially Fig. 14), which springs are mounted on a pin or the like 115$^b$ passed through each arm 107 of the yoke 108. A cap screw 115$^a$ screw-threaded through each arm 107 projects therefrom and passes between the arms 113$^a$ of a spring 114$^a$ and holds one or the other of said arms 113$^a$ from movement with the pin 106 thereby tensioning the spring for action on said pin. Therefore, when the steering wheel 92 is released, springs 114$^a$, together with spring 101, will return the valve J to neutral position.

The hydraulic system for controlling the steering and the scarifying attachment, is shown diagrammatically in Figs. 15 and 16. It will be understood that the controls of the steering and the scarifying attachment are independently operable, but they are interconnected in such a way as to be actuated from a common source of power and utilize common pressure control instrumentalities.

As illustrated in Figs. 15 and 16, the valve G and hydraulic motor H are employed for the control of the scarifying attachment, while the valve J and hydraulic motor K are employed for controlling the steering. However, since the action of both sets of instrumentalities is similar, it is necessary to describe in detail, only the construction of one of them.

In the mechanism illustrated in these views, it will be understood that any suitable liquid may be employed as the hydraulic medium, a free-flowing mineral oil which retains its free-flowing properties even under low atmospheric temperatures, being suitable.

As illustrated, a manifold block 113 (Figs. 21 and 22) is provided with a supply passageway or intake 115 and a discharge passageway reached by outlet or port 116. The supply passageway 115 and the discharge passageway are connected in parallel with a pressure regulator 114, the control valve G and the control valve J.

Figure 21:
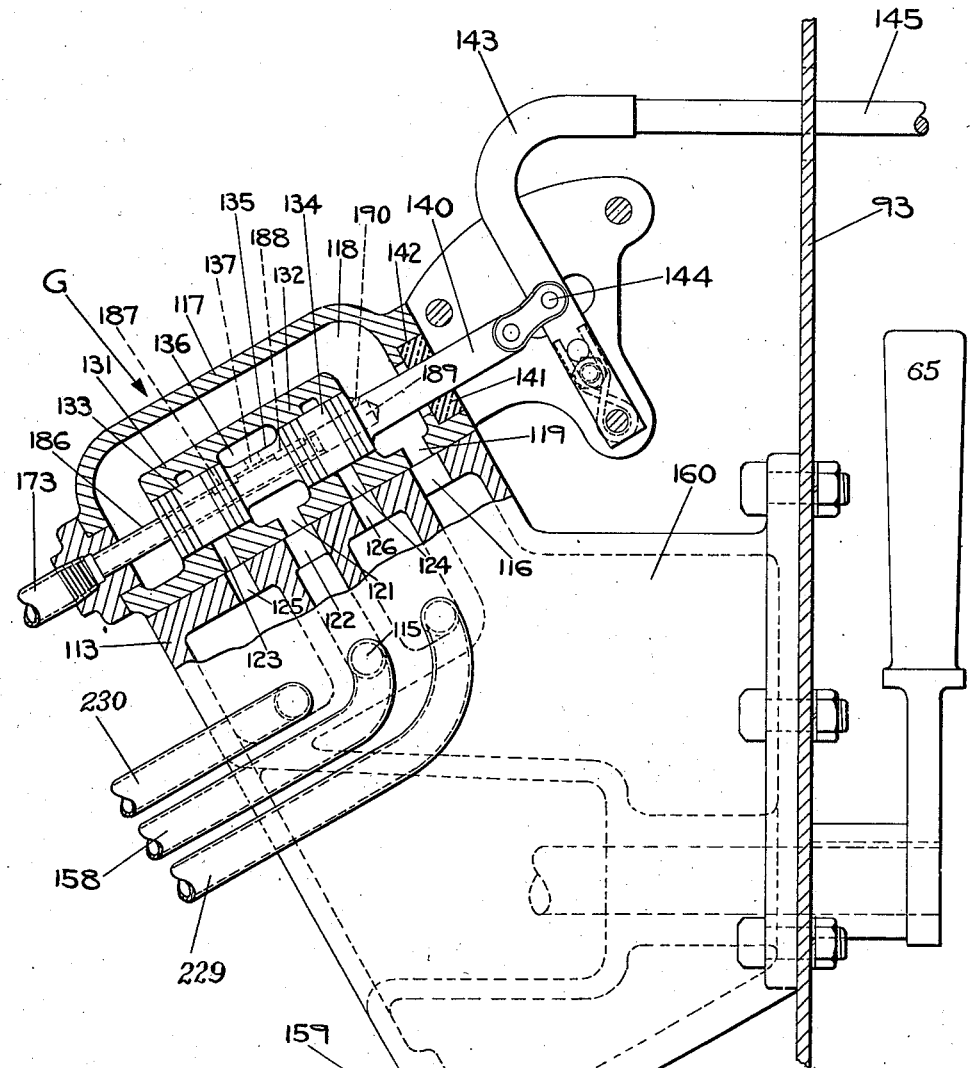
Fig. 21 is a detail view, partly in section and partly in elevation, illustrating the mounting of the valve of Fig. 19 or Fig. 20 upon a manifold, which manifold in practice is integral with the supply tanks shown in Figs. 15 and 16.
Figure 22:
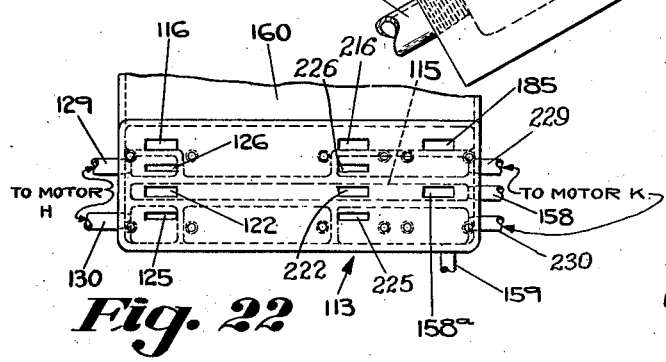
Fig. 22 is a plan view of the combined manifold and the fluid supply tank shown in Fig. 21, the motor controlling valves and the pressure regulating valve being omitted.

As best seen in Figs. 19, 20 and 21, valve G comprises a housing 117, having a chamber 118 therein, which extends from one end of the valve to the other, and which communicates, by means of the port 119, with the outlet 116 in the manifold block.

A port 121 in the bottom of the housing 117 registers with a port 122 in the top of the manifold 113, the port 122 being in communication with the supply passageway 115. On opposite sides of the port 121 are ports 123 and 124, which respectively register with ports 125 and 126 which communicate with motor passageways leading to pipes 130 and 129, respectively, attached to the manifold block.

Mounted in slide bearings 131, 132 within the housing 117 is a piston valve having two cylindrical sections 133 and 134, the sections having a connection 135 between them of reduced diameter to afford an annular chamber 136 for transmission of fluid pressure from the port 121 to the port 131 communicating with bore 189 in the piston valve.

A rod 140 is connected to the piston valve and mounted to slide in the bearing 141, which is preferably of composition material, circular in shape, and having a water-tight fit with the opening 142 on the front end of the housing 117.

Interconnected with the rod 140 is a lever arm 143, the interconnection being the pivot 144. The arm 143 terminates in rod 145 and actuating knob 146. In connection with the valve J, it will be observed that the parts corresponding to these parts are the steering post 91 and the steering wheel 92.

The pipes 129 and 130 are connected to the opposite ends of the cylinder 154 of a hydraulic motor H with the piston 155 movable therein. The piston 155 is connected to a piston rod 156, and the latter in turn is connected with the scarifying mechanism for raising and lowering the scarifying teeth 87.

The hydraulic pump 157 (Fig. 23) is connected by the supply pipe 158 to the supply passageway 115 (Figs. 21 and 22) in the manifold 113. The suction pipe 159 is connected between the pump 157 and the supply tank 160 for the pressure medium, such as oil. A discharge pipe 161 connects the discharge passageway in the manifold with the supply tank 160, if the tank and manifold are not in direct communication.

When the lever 145 is pushed toward the housing 117 to move the rod 140, the annular chamber 136 provides communication between the supply port 122 and the motor port 125. That is to say, the connector 135 of reduced diameter is moved to such a position that communication is established between the ports 121 and 123 (Fig. 19), while the piston section 134 keeps closed the left-hand opening in the cylindrical bearing 132. At the same time that the ports 121 and 123 are connected, the movement of the right-hand piston section 134 toward the left as viewed in Fig. 19 establishes communication between the port 124 and the port 119. As seen in Fig. 15, this will provide oil under pressure to pipe 130 to operate motor H to lift the scarifier, a return path for oil above the piston 155 of said motor H being provided over pipe 129 to tank 160 through ports 126, 124, 119 and 116. It should be understood that the right-hand piston section 134 may abut against the inner wall of the housing 117 to enable the operator to be assured that when he moves the lever 145 to advance the valve toward the end of the housing 117 as far as it will go, the ports 123 and 124 will be completely and accurately opened so that operation of the hydraulic motor H may be commenced in a minimum space of time by having full power applied thereto immediately after the valve is opened.

In a similar manner when the valve is moved in the opposite direction by pulling on the lever 145, the end of the casing will act as an abutment to accurately limit the right-hand movement of the piston valve to a position where the ports 123 and 124 will be completely opened. When the piston valve is moved toward the right, as viewed in Figs. 20 and 21, the supply port 121 will be connected to the motor port 124, and the port 123 will communicate with port 119 by way of chamber 118; the flow of the pressure medium through the pipes 129 and 130 will thus be reversed and the movement of the piston 155 in the cylinder 154 will be reversed.

The hydraulic motor H connected to the valve G will be locked in adjusted position whenever the valve G is in central and closed position. For instance, in Fig. 16, the piston 155 is midway between the ends of the cylinder 154 where it is locked against movement in either direction by the closure of the valve G, because, when the latter is closed, the two piston sections 133 and 134 close the ports 123 and 124 and lock the liquid in the pipes 129 and 130, and in the cylinder 154.

The control valve J for controlling the hydraulic motor K, by which steering is effected, is similar to valve G, except for the construction of the housing 109, as previously described, and except for the operating means for lever 240 thereof, also previously described. Briefly described, valve J comprises housing 109 having a discharge chamber 218 in communication with discharge port 219 adapted to register with port 216 (Fig. 22) in manifold block 113 upon which said valve J is mounted.

Figure 9:
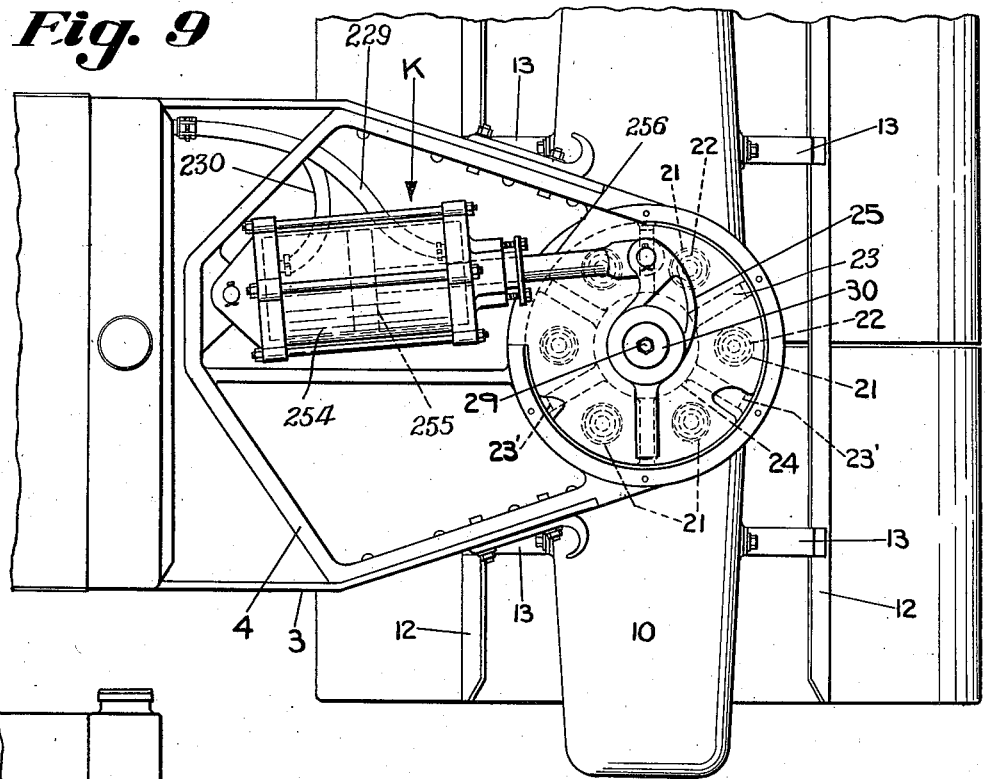
Fig. 9 is a plan view of the structure of Fig. 8.

The manifold block 113 is also provided with ports 226, 222 and 225 which register with ports 224, 221 and 223, respectively, of valve J. Port 221 is a pressure port and is connected to pressure pipe 158 through port 222 and supply passageway 115, similar to the communication of port 121 with port 122 and passageway 115, as seen in Fig. 21. Through ports 226 and 225 (Fig. 22), ports 224 and 223 communicate with pipes 229 and 230, respectively, which lead to the steering hydraulic motor K, having a cylinder 254, piston 255 and piston rod 256. The motor K is housed in the casting 4, as seen in Fig. 9 of the drawings.

The operation of motor K by controlling valve J will be evident, because of its similarity to valve G. A turning of the wheel 92 in a clockwise direction will cause the plunger of valve J to move upwardly to the position illustrated in Fig. 15 in which position oil under pressure is supplied to the motor K to move the piston rod 256 to the left. A reverse rotation of wheel 92 will produce a reverse movement of piston rod 256. When released, wheel 92 automatically returns to its neutral position, as does the plunger of valve J, in which position piston 255 of motor K is locked due to entrapment of oil in pipes 229 and 230.

The pressure regulator 114 is mounted on the manifold block 113 to cooperate with ports 158a and 185 (Fig. 22), and connected in parallel with valves G and J. The pressure regulator 114 comprises a housing 162 having therein a port 163 which is controlled by the lower end 164 of a vertical piston valve 165 movable vertically in the cylinder 166. This cylinder 166 is closed at its upper end by the removable screw cap 167 having a lower conical end 168 acting as an abutment to limit the upward travel of the piston valve 165.

The housing 162 is also provided with a passageway 169, which connects the chamber 170 at the upper end of the cylinder 166 through the connection 171, threadedly mounted at 172 within the housing 162. The connecting device is connected to the pipe 173, which, in turn, is connected to both of the valves, as shown in Figs. 15 and 16.

A central vertical bore or passageway 174 in the piston valve 165 communicates through the ports 175, 175 with the passageway 176, which in turn opens into a port 177. Port 177 is connected with the discharge passageway of the manifold 113 by port 185.

Screw threaded into the top of the piston valve 165 is an auxiliary valve element 181, which is provided with a central vertical opening 182, the lower end of which is adapted to be closed by means of a ball 183, below which is mounted a spring 184. Inasmuch as the bore 174 does not extend through the bottom 164 of the piston valve 165, an elongated cup is provided for the spring 184. This spring, therefore, is able to urge the ball valve 183 to closed position and to hold it closed during operation of the hydraulic motor comprising the cylinder 154.

The action of this pressure regulator 114 may be understood by following in sequence the various steps in effecting the start and stopping of the hydraulic motor 4 comprising the cylinder 154 and the piston 155, assuming motor K and valve J to be inactive. When the valve G is in closed position the low pressure in the supply pipe 158 and the branch pipes 158a will be sufficient to hold the piston valve 165 in its open position. The pump 157 may be continuously operated while the hydraulic motor H is inactive and the valve G is closed, and during such time liquid will flow through the port 163 into passageway 176, and thence through the port 177, whence it passes to the manifold through discharge port or pipe 185 into the tank 160. The suction side of the pump 157 is connected by means of the pipe 159 to the tank 160.

When the valve G is moved to either motor operating position, a branch low pressure connection is established between the supply pipe 158 and the chamber 170 in the upper end of the cylinder 166 of the pressure regulator, as hereinafter described. It will be seen, by reference to Fig. 21 that a stationary pipe 186 is connected to pipe 173 communicating with passageway 169 in the pressure regulator. So long as the valve G is closed, the port 137 is closed, but when the valve is moved to open or motor operating position, the port 137 registers with either the port 187 or the port 188 in the stationary tube 186. The right-hand end of the tube 186 is open and extends into the central bore 189 of the piston valve, and the small restricted opening 190 connects the bore 189 with the chamber 118. The restricted opening 190 prevents locking of the lever 145 by enabling it to be moved in either direction at any time irrespective of the confinement of the liquid in the pipe 173, the passageway 169, and chamber 170.

When the valve G is moved to its open position, the supply pipe 158 is connected through the port 137 with the port 187, and therefore a low pressure connection is established to the chamber 170 above the piston valve 165. When this occurs, the valve 165 is still in its open position, but the hydraulic pressure after opening of the manual valve being exerted with a substantially equal force at both ends of the piston valve 165, the latter will be able to drop by gravity, or if the forces acting on the ends of the piston valve 165 should be unequal, the weight of the valve will nevertheless be sufficient to cause the same to move downwardly to its closed position.

It will be seen that the lower end 164 of the piston valve 165 is of less cross-sectional area than the cross-sectional area of the cylinder 166. The annular seat 191 surrounds the port 163 which is of the same cross-sectional area as the lower end of the valve 165.

Therefore, if the piston valve 165 is closed, the pressure on the top will be greater than the pressure exerted on the lower end 164. The low pressure passageway 176 being closed, the by-pass flow through the low pressure pipes 158a and 185 will be discontinued, and the continued operation of the pump 157 will build up pressure. Assuming the rod 140 to have been moved to the left, as viewed in Fig. 15, the liquid will be forced into the pipe 130. The piston 155 will therefore be forced upwardly in cylinder H and the liquid behind the piston will flow through the pipe 129, port 126, port 124, chamber 118, ports 119 and 116, thence through the discharge passageway or the pipe 161, and thence into the tank 160. During the movement of piston 155, pressure will be exerted through the pipe 173 and the passageway 169 to hold the valve 165 in its closed position.

When the piston 155 reaches the end of its stroke and the manual valve G still remains in its open position, the pump 157 may continue to operate without building up excessive pressure, because the ball check valve 183 will be lowered against the spring 184, and liquid will be by-passed through the center of the valve 165 and the ports 175 into the passageway 176, thence to the pipe 185 and into the tank 160, as illustrated in Fig. 15.

As soon as the manual valve G is closed, the port 137 will be closed and the continually operated pump 157 can supply the liquid in the pipe 158 to no other passageway than that designated 176. An impulsive force will be exerted, therefore, on the lower end 164 of the valve 165 to move the latter upwardly. If the ball check valve 183 happens to be closed at the time such impulsive force is exerted, the confinement of the liquid in the pipes 173, passageway 169, and chamber 170 will effect opening of the check valve while the piston valve 165 is being moved to its upper position, whereupon the check valve will automatically close, and a relatively low pressure from the pump will hold the valve 165 in its upper position while the pump 157 continues to be driven at substantially no load or at a very low pressure, thereby economizing in the consumption of fuel in the engine.

The pressure gauge 192 may be connected to the pipes 173 so that whenever the manual valves G or J are open the operator may determine, by observing the pressure gauge, whether the pump 157 is operating properly or the check valve 183 is opening at the pre-determined pressure.

It is to be understood that the supply pipe 158 and the connections between the same and the hydraulic motor through the manually operated valves G and J and the connections to the pressure regulator 114 should always be filled completely with liquid, preferably oil, so that the pressure regulator will act very quickly upon the opening of the manual valves to secure quick starting of the respective hydraulic motor.

The pump 157 is driven from shaft 193, the pump being suitably mounted on the frame C and the shaft 193 being driven, in any convenient manner, from the engine. For convenience of control, a valve 194 is positioned between the pump 157 and pipe 158. The water pump for the engine cooling system is indicated at 195.

It will therefore be seen that, with the pump 157 continuously operating, when the steering wheel 92 is manipulated, piston 255 in cylinder K is actuated, thus rotating steering arm 25 which, it will be recalled, is splined to the king pin 16 of forward roller D, the arm 25 and piston 255 being interconnected by piston rod 256. Steering of the machine either in a right-hand or left-hand direction is accomplished with very little effort by an operator seated on operator's seat 196; and when the steering wheel 92 is released, springs 101 and 114a automatically return the valve J to neutral position, thereby locking the piston 255 in cylinder K in its adjusted position. The hydraulic steering mechanism will turn the front roller D when the machine is standing still and in soft material, which materially adds to the ease of manipulation of the roller; and, in practice, the steering mechanism enables the operator to get full benefit of the extreme turning range of the front roller quickly and without effort.

In a similar manner the motor H is controlled by valve G to move the scarifier to any desired position and there locked.

Due to the parallel relation of valves J and G, it is evident that the pressure regulator 114 is effective to provide a no-load by-pass for pump 157 when neither valve J nor G is operated, but when either valve J or G, or both, are operated said pressure regulator 114 closes the by-pass and directs the output of said pump 157 to motor K or H, or both.

It will be noted from the drawings that the front end of frame B is of a highly arched and undercut design, which affords a high arc of turning range of the front roller D, this arc being in practice approximately 100 degrees. This feature, together with an exceptionally short wheel base and the improved steering mechanism above described, results in the machine having an exceptionally short turning radius.

Within close proximity of the steering wheel are located the various control instrumentalities, such as the usual clutch levers, gear shift lever, hand brake lever, engine controls, differential lock lever, and scarifier lever. These various instrumentalities are not specifically shown in the drawings, but in practice they are all disposed so as to be operable from the operator's seat.

The scarifier attachment and combinations including the scarifier attachment are claimed in my co-pending application, Serial No. 127,719, filed February 25, 1937, for an improvement in Road rollers, which application was filed as a continuation in part of this application.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a self-propelled vehicle, the combination with an engine, of power transmission mechanism, a chassis frame, traction wheels connected to said power transmission mechanism, guide blocks extending laterally from said chassis frame at the axis of said traction wheels, a supplemental frame, guide frames on the inner sides of said supplemental frame and fitting the vertical spaced-apart sides of said guide blocks, crosspieces connecting the upper and lower ends of said vertical spaced-apart sides of said guide frames, springs between the tops of said guide blocks and the said upper and lower cross-pieces, and apparatus for steering the vehicle.

2. In a self-propelled vehicle, the combination with an engine, of a power transmission mechanism, a chassis frame for supporting the engine and power transmission mechanism, driving wheels connected to said power transmission and supporting the chassis frame at its rear end, a main frame, spring means supporting the rear portion of said main frame by the rear portion of said chassis frame, spring connections between the forward portion of said chassis frame and the forward portion of said main frame, a steering and supporting wheel, a support between said steering wheel and the forward end of said main frame, and means for operating said steering wheel to guide said vehicle.

3. In a road working machine, the combination with a main frame, a wide rimmed roller adapted to support the front end thereof, an auxiliary frame, a motor rigidly attached to the forward portion of said auxiliary frame, a gear casing attached rigidly to said motor and forming the rear portion of said auxiliary frame, rear roller wheels rotatably and non-resiliently connected to said gear casing for supporting the rear end of said auxiliary frame, axles extending inwardly from said rear roller wheels into said gear casing, drive means between said motor and said axles, said main frame extending rearwardly at least to said axles, spring means positioned near said axles for flexibly connecting said main and auxiliary frames, additional spring means positioned near said motor for flexibly connecting said main and auxiliary frames, steering means for said wide rimmed roller mounted on said main frame, and a driver's support on said main frame adjacent said steering means, whereby the shocks received by said auxiliary frame would not be entirely transmitted to said steering means or said driver's support.

4. In a road working machine, the combination with a main frame, of a yoke having an upright shaft extending into said frame at the front end thereof, means for resiliently connecting said yoke and said frame, a guiding and supporting roller attached to said yoke, means for turning said yoke about the axis of said shaft to effect guiding of said machine including a wheel mounted on said main frame, an auxiliary frame, a motor attached to said auxiliary frame, a gear casing rigidly attached to said motor and forming a part of said auxiliary frame, rear roll wheels attached to said casing for supporting the auxiliary frame, drive means for connecting the motor to said rear wheels, flexible means for connecting said main frame and said auxiliary frame both forwardly and rearwardly thereof, and a driver's support carried by said main frame adjacent said steering wheel, whereby the main frame, the steering wheel and the driver's support are flexibly supported and do not receive the shock or vibration of said auxiliary frame with full force.

5. In a self-propelled vehicle, the combination with a frame providing a cylindrical casing having an open bottom and a central opening in the top thereof, a wheel yoke having an upright shaft extending into said casing and through said opening, a plate on said shaft forming a movable bottom for said casing, a plurality of coil springs spaced around said shaft and bearing on said plate and the top of said casing, a cap on said frame spaced from said casing top, a journal bearing on said cap adapted to receive said shaft, a lever positioned between said cap and said casing and having a non-circular opening through which a non-circular portion of said shaft slidably extends whereby movement of said lever will rotate said shaft, and means for imparting movement to said lever.

6. In a self-propelled vehicle, the combination with a frame providing a cylindrical casing having an open bottom and a central opening in the top thereof, a wheel yoke having an upright shaft extending into said casing and through said opening, a plate on said shaft forming a movable bottom for said casing, a plurality of coil springs spaced around said shaft and bearing on said plate and the top of said casing, detents carried by said plate to retain said springs in a fixed position, a cap on said frame spaced from said casing top, a journal bearing on said cap adapted to receive said shaft, a lever positioned between said cap and said casing and having a non-circular opening through which a non-circular portion of said shaft slidably extends whereby movement of said lever will rotate said shaft, and means for imparting movement to said lever.

7. In a road roller, the combination with a main frame, of a supplemental frame having an engine and gear housing rigidly mounted thereon, the gear housing forming a part of said supplemental frame, ground engaging roller wheels rotatably and non-flexibly connected to the rear of said supplemental frame for rotation on a fixed axis with respect thereto, said engine, gear housing, supplemental frame and roller wheels forming a heavy structure adapted to roll material level, a steering frame, a steering roller carried by said steering frame, flexible means for attaching the steering frame to the front end of said main frame, spring means for supporting the rear end of said main frame on the rear end of said supplemental frame, flexible means for attaching the front end of said supplemental frame to said main frame, whereby the main frame will be entirely flexibly supported to reduce the effect of shocks received by the rollers on said main frame and whereby the main frame will be entirely flexibly connected to said supplemental frame to reduce the effects of vibrations of said supplemental frame on said main frame, and steering means for said front roller at least part of which is carried on said main frame.

8. In a vehicle, the combination with a main frame, of a supplemental frame having an engine and gear housing rigidly mounted thereon and forming a part thereof, ground engaging non-pneumatic traction means rotatably and non-flexibly connected to the rear of said supplemental frame for rotation on a fixed axis with respect thereto, said engine, gear housing, supplemental frame and traction means forming a heavy body, a steering frame, steering means carried by said steering frame, means attaching the steering frame to the front end of said main frame, spring means for supporting the rear end of said main frame on the rear end of said supplemental frame whereby the shocks received by said supplemental frame will not be wholly transferred to said main frame, non-rigid means connecting the front end of said supplemental frame to said main frame, which with said previously named flexible means is effective to reduce the effects of vibration of said supplemental frame on said main frame, a driver's seat mounted on said main frame, and steering apparatus for controlling said steering frame and mounted on said main frame near said driver's seat, whereby the driver will not be subject to the full force of the shocks or vibrations of said supplemental frame.

9. In a vehicle, the combination with a tractor unit comprising a rigidly attached motor and gear housing carrying ground engaging traction means rotatably but non-flexibly attached to said housing, said tractor unit presenting a heavy structure, of a main frame including side members on each side of said tractor unit and extending to the rear axle of said tractor unit, spring means for flexibly supporting the rear end of said main frame from said tractor unit whereby the shocks and vibrations of said tractor unit will not all be imparted to said main frame, wheel means for supporting the front end of said main frame, means interconnecting the front end of said tractor unit and said main frame to allow relative movement therebetween, steering means for said wheel means, said steering means being carried by said main frame, and a driver's support carried by said main frame whereby the shocks and vibrations of said tractor unit will not be entirely transferred to the driver's support.

10. In a road roller, the combination with a main frame, of a supplemental frame having an engine and gear housing rigidly mounted thereon, the gear housing forming a part of said supplemental frame, ground engaging roller wheels rotatably and non-flexibly connected to the rear of said supplemental frame for rotation on a fixed axis with respect thereto, said engine, gear housing, supplemental frame and roller wheels forming a heavy structure adapted to roll material level, a steering frame, a steering roller carried by said steering frame, flexible means for attaching the steering frame to the front end of said main frame, spring means for supporting the rear end of said main frame on the rear end of said supplemental frame, flexible means for attaching the front end of said supplemental frame to said main frame, whereby the main frame will be entirely flexibly supported to reduce the effect of shocks received by the rollers on said main frame and whereby the main frame will be entirely flexibly connected to said supplemental frame to reduce the effects of vibrations of said supplemental frame on said main frame, steering means for said front roller, and road working means carried by said main frame and adapted to engage a road surface.

11. In a vehicle, the combination with a main frame, of a supplemental frame having an engine and gear housing rigidly mounted thereon and forming a part of said supplemental frame, ground engaging non-pneumatic traction means rotatably and non-flexibly connected to the rear of said supplemental frame for rotation on a fixed axis with respect thereto, said engine, gear housing, supplemental frame and traction means forming a heavy body, a steering frame, steering means carried by said steering frame, means attaching the steering frame to the front end of said main frame, spring means for supporting the rear end of said main frame on the rear end of said supplemental frame whereby the shocks received by said supplemental frame will not be wholly transferred to said main frame, flexible means connecting the front end of said supplemental frame to said main frame, which with said previously named flexible means is effective to reduce the effects of vibration of said supplemental frame on said main frame, a driver's seat mounted on said main frame, steering apparatus mounted on said main frame near the driver's seat and adapted to control said steering frame, and earth working means carried by said main frame, whereby the driver's seat and the earth working means will not be subject to the full force of the shocks or vibrations of said supplemental frame.

12. In an earth working vehicle, the combination with a main frame, of a supplemental frame having an internal combustion engine and gear housing rigidly mounted thereon, ground engaging traction means connected to said gear housing, said engine, gear housing, supplemental frame and traction means forming a tractor unit, a steering frame, steering and supporting wheel means carried by said steering frame, means pivotally attaching the steering frame to the front end of said main frame, spring means for supporting the rear end of said main frame from said tractor unit, earth working means carried by said main frame, steering means carried by said main frame for operating said steering frame to steer said vehicle, operator's supporting means adjacent said steering means and carried by said main frame, whereby the steering means, operator's support and earth working means are carried by the main frame which is flexibly supported by said tractor unit, and thereby does not receive the full shock received by said tractor unit.

13. In a vehicle steering mechanism, the combination with a slide valve having a stationary casing, an operating wheel for said valve, means for translating rotary movement of said wheel into reciprocatory movement of said valve, and means biasing said wheel to a normal valve closing position.

14. In a vehicle steering mechanism, the combination with an operating wheel, means for biasing said wheel to a normal position when released, a slide valve having a stationary casing, and means for converting rotary movement of said wheel into reciprocatory movement of said valve.

15. In a vehicle steering mechanism, the combination with an operating wheel, said wheel being movable in either direction of rotation from a normal position, means biasing said wheel to a normal position, a slide valve having a stationary casing and a piston movable to either side of a port closing position, and means interconnecting said wheel and piston so constructed and arranged that reverse rotary movement of said wheel from its normal position will produce reverse movement of said slide valve piston from its port closing position.

16. In a vehicle steering mechanism, the combination with a valve having a stationary casing and a piston having a central port closing position and two port controlling positions, a wheel for controlling said valve, and means biasing said wheel to a position to close said valve when released after being operated to effect movement of said valve to either port controlling positions.

17. A rigid supporting structure for the power plant of a road roller, comprising spaced side plates connected at their forward portions by a cross-piece constructed and arranged to support the forward portion of the power plant, inward projections from the forward portions of said side plates constructed and arranged to serve as supports for the power plant radiator and box-like receivers surrounding transversely aligned openings in the rear portions of said side plates, through which openings the driven shafts of the bull wheels of the road roller are adapted to project, said box-like receivers being rigidly secured to the inner sides of said plates in position to receive the bull wheel gear housing with springs above and below the same and with the front and rear sides of said housing guided along the vertical sides of said receivers.

18. In a vehicle, the combination with a supporting frame, of a steering unit therefor, a fluid pressure motor connected to said steering unit to operate the same, a steering wheel, a rotary non-reciprocating shaft connected to said wheel to rotate therewith, a cam device connected to said shaft to rotate therewith, non-rotary rectilinearly movable valve mechanism for controlling said motor, means actuated by said cam device for imparting rectilinear movement to said valve mechanism upon manual rotation of said steering wheel, and resilient means for returning the valve mechanism and the steering wheel automatically to initial positions upon release of said wheel.

19. In a vehicle, the combination with a supporting frame, of a steering unit therefor, a hydraulic motor connected to said steering unit to operate the same, a steering wheel, a rotary shaft connected to said wheel to rotate therewith, a cam device connected to said shaft to rotate therewith and provided with a pair of spiral cam slots, valve mechanism for controlling said hydraulic motor and comprising a valve stem, a transverse pin extending through said spiral cam slots, a support provided with a pair of rectilinear spaced-apart slots for slidably receiving the ends of said transverse pin, centering spring mechanism acting on said transverse pin, and a spring connected to said shaft to cooperate with said centering spring in returning the valve mechanism to closed position and said shaft to initial position upon release of said steering wheel.

20. In a self-propelled road roller, the combination with rear traction rollers, of an engine, power transmission mechanism between said engine and said traction rollers, a chassis frame for supporting said engine and power transmission mechanism, the rear end of said chassis frame and said power transmission mechanism being non-yieldingly supported on said rollers, a main frame, mechanism for yieldingly supporting the rear end of said main frame on the rear end of said chassis frame at said rear wheels, a steering front roller unit, means for yieldingly supporting the front end of said main frame on said front roller unit, and means for operating the steering wheel unit to guide the road roller.

21. In a self-propelled road roller, the combination with a main frame, of an internal combustion engine, ground-engaging traction rollers, power transmission mechanism between said engine and said ground-engaging traction rollers, a chassis frame for said engine and comprising a housing for said power transmission mechanism, mechanism for non-flexibly mounting said chassis frame on said ground-engaging traction rollers the axis of rotation of which is in fixed relation to said chassis frame, a steering roller unit, means for supporting the front end of said main frame resiliently on said steering roller unit, resilient means for supporting the rear portion of said main frame on the rear end of said chassis frame whereby shocks received by the chassis frame will be absorbed before transmission to said main frame, an operator's station on the main frame, and apparatus controllable from said operator's station for actuating said steering roller unit while the shocks or vibrations thereof will be absorbed before transmission to said main frame.

22. In a self-propelled road roller, the combination with a tractor unit comprising an engine mounted on a chassis frame rigidly connected to a transmission housing having rotatably but non-flexibly secured thereto ground-engaging rollers, said tractor unit presenting a heavy roller structure for direct action on the roadway, of a main frame including side members on opposite sides of said tractor unit and extending to the rear axle of said tractor unit, resilient means for flexibly supporting the rear end of said main frame on said tractor unit adjacent to the axis of said ground-engaging rollers whereby shocks and vibrations during operation of the ground-engaging rollers will be absorbed by said resilient means before transmission to said main frame, a steering roller unit, means for resiliently supporting the front end of said main frame on said steering roller unit, power operated mechanism for operating said steering roller unit, an operator's station, and means for controlling said power operated steering mechanism from said station.

23. A road roller comprising the combination with a tractor unit comprising an engine connected through power transmission mechanism to ground-engaging rollers with the axis of rotation of the latter in fixed relation to the chassis for the engine to secure a heavy and direct ground-engaging roller unit, a main frame, means comprising shock absorbing mechanism for mounting the main frame on the axle of the ground-engaging rollers of the tractor unit, means comprising shock absorbing mechanism for connecting the front end of the tractor unit to said main frame, a steering roller unit connected to the front end of said main frame in advance of said tractor unit, power operated mechanism for steering said steering roller unit, an operator's station on said main frame, and means for controlling said power operated steering mechanism from said station.

24. A road roller comprising the combination with rear ground-engaging traction rollers, of an engine connected to said rollers to drive the same and propel the road roller along the roadway, a front road roller steering unit comprising an upright steering post, an arm connected to and extending radially from said steering post, supporting framework for said engine and for connection to said steering post, a reciprocating hydraulic motor pivotally connected at one end to said supporting framework and at its other end to said radial arm, a hydraulic pump connected to said engine for operation thereby, valve mechanism connected between said pump and said motor for controlling the operation of the latter, and manually operated means for controlling said valve mechanism to secure swinging of said radial arm to actuate the steering unit in either direction and lock the same in adjusted position by the locking of said hydraulic motor.

25. A road-working machine comprising the combination with a tractor unit including an internal combustion engine connected by transmission gearing through a housing to ground-engaging traction means rotatably connected to said housing, of a main frame mounted on the rear axle of the traction unit, a steering wheel unit connected to the front end of said main frame, a reciprocating hydraulic motor pivotally connected at its ends to said main frame and to said steering wheel unit, a hydraulic pump connected to said engine to be driven thereby, and hydraulic connections comprising valve mechanism for controlling the flow of liquid to and from said motor to turn said steering wheel unit and to lock the motor to hold the steering wheel unit in fixed relation to said main frame during movement of the machine along the roadway.

26. A road-working machine comprising the combination with a tractor unit including an engine connected by transmission gearing through a housing to ground-engaging traction means rotatably connected to said housing, of a main frame, means for flexibly connecting said main frame to said tractor unit for limited lateral tilting relative thereto, a steering wheel unit pivotally connected to said main frame on an upright axis, power-operated mechanism connected to said steering wheel unit to turn the same on said upright axis to steer the machine, and operator-actuated means for controlling said power-operated mechanism.

27. A road rolling roller comprising the combination with a vehicle frame, of a steering roller unit having an upright steering post projecting upwardly therefrom and pivotally connected to the front end of said frame, an arm connected to said post and extending radially therefrom, a reciprocating hydraulic motor pivotally connected at its ends to said frame and to said arm, and means for effecting the operation of said motor to turn said steering roller unit on said upright axis to steer the machine.

28. A road rolling roller comprising the combination with vehicle framework, of power-operated mechanism for propelling the same along a roadway, a roller steering wheel unit comprising an upright steering post pivotally connected on an upright axis to the forward end of said framework and pivotally connected on a horizontal axis to a roller yoke, a horizontal reciprocating hydraulic motor at the top of the forward end of said framework pivotally connected at its ends to said framework and to said post, and means for effecting operation of said hydraulic motor to turn said post on its upright axis while said yoke and the roller connected thereto are free to tilt relatively on said horizontal axis.

29. A road rolling roller comprising the combination with a tractor unit including an internal combustion engine connected through power transmission gearing to rear ground-engaging traction rollers, of a main frame flexibly connected to said tractor unit for limited lateral tilting movement relatively thereto, a steering roller unit comprising a roller yoke pivoted on the horizontal longitudinal axis to an upright steering post, mechanism for pivotally connecting said steering post to the forward end of said main frame, power-operated mechanism connected to said post and carried by the forward end portion of said frame to turn said post on said upright axis to effect steering of the machine, and means for controlling said engine, and said power-operated mechanism to effect operation of the road roller while the tractor unit may tilt laterally relatively to the main frame and the front steering roller unit may tilt transversely of the roadway relatively to said main frame on said horizontal longitudinally extending axis.

30. A road roller comprising the combination with a main frame, of a steering and rolling roller unit pivotally connected on an upright axis to the forward end of said main frame, a hydraulic motor mounted on the forward end portion of said main frame and connected to said steering and rolling roller unit to turn the same on said upright axis to effect steering of the machine, a hydraulic pump driven continuously by said engine, means comprising valve mechanism for controlling said hydraulic motor and to effect locking thereof in adjusted position to hold the steering roller unit in fixed relation to said frame on said upright axis, and means to effect a no-load by-pass for said pump to enable the latter to operate continuously at substantially no load when said hydraulic motor is located as aforesaid.

31. A road roller comprising the combination with a self-propelled road roller unit including a rigid chassis non-flexibly mounted on the rear axle of ground-engaging rollers, said chassis supporting an internal combustion engine connected by power transmission gearing to said rolling rollers to afford a heavy and direct downward pressure thereon, of a main frame flexibly connected to said unit for limited lateral movement relatively thereto, a steering rolling roller unit pivotally connected to the forward end of said main frame for turning movements relatively thereto on an upright axis, power operated mechanism connected to said steering unit at said upright axis, and means for controlling said power operated mechanism to effect steering of the machine during travel along the roadway while said road roller unit is able to tilt transversely of the roadway relatively to the main frame and the said steering unit.

32. A road-working machine comprising the combination with a main frame, of a steering wheel unit at the forward end of said main frame, means for supporting the rear portion of said main frame, a hydraulic motor for operating said steering wheel unit, means comprising a steering wheel operatively connected to a valve mechanism for controlling said hydraulic motor, a pump, a relatively low pressure by-pass for said pump to enable the latter to operate at substantially no load when said hydraulic motor is not operating, and means for automatically restoring said steering wheel to initial position and actuating said valve mechanism to lock the motor in adjusted position and at the same time establish a low pressure by-pass around the pump as aforesaid.

33. A road roller comprising the combination with a frame, of a steering roller unit having an upright steering post projecting upwardly therefrom, means connecting said steering post to said frame for relative up and down sliding movement, resilient means for yieldingly supporting the front end of said frame on said steering unit, an actuating arm having a hub connected to said post to rotate therewith but permitting the latter to slide upwardly and downwardly relatively to said hub, a hydraulic reciprocating motor pivotally connected at its ends to said frame and said actuating arm respectively, and means for controlling the operation of said motor while the forward end of said frame is yieldingly supported on the steering unit.

34. In a road roller, the combination with a tractor roller unit comprising a chassis frame having thereon an engine connected through power-transmission gearing to ground-engaging traction rollers rotatable on an axis fixed in relation to said chassis frame with the latter non-flexibly mounted on the axle of said rollers, of a main frame, resilient means for yieldingly supporting the rear portion of said frame on said axle, a steering roller unit pivotally connected to the front end of said frame, means for effecting operation of said steering wheel unit, a flexible connection between said tractor roller unit and said main frame between said axle and said steering roller unit, and shock absorbing means between said frame and the lower sides of said axle.

35. In a vehicle steering apparatus, the combination with a rotary steering wheel, of a shaft connected thereto to rotate therewith, means for supporting said shaft in a diagonal position, valve mechanism comprising a valve stem in alignment with said shaft, a cam device connected to the lower end of said shaft, means actuated by said cam device upon rotation of said steering wheel to open said valve mechanism by movement of said valve stem toward said shaft or away therefrom, and a spring acting on said shaft to restore the same to initial position when said wheel is released and thereby restore said cam device to initial position and effect reclosure of said valve mechanism.

36. In a vehicle steering apparatus, the combination with a rotary steering wheel, a shaft connected thereto to rotate therewith, a cam device connected to said shaft remote from said steering wheel, a hydraulic motor, valve mechanism for controlling said motor, means actuated by said cam device for effecting operation of said valve mechanism to open position to in turn effect the operation of said motor, centering spring mechanism acting to automatically reclose said valve mechanism when released, and a spring acting on said shaft to restore the same to initial position when said steering wheel is released.

37. A frame for a road-working machine comprising a pair of spaced-apart parallel flat side plates, transversely extending connecting means between said side plates, inwardly extending box-like receivers on the inner walls of said plates surrounding transversely aligned openings in the rear portions of said plates, said box-like receivers being rigidly secured to the inner sides of said plates and adapted to receive the axle of a tractor unit with springs interposed between the upper and lower sides of such axle and the upper and lower inner walls of said box-like receivers.

38. In vehicle steering apparatus, the combination with a steering wheel unit having an upright steering post, of a supporting frame having at its front end a bearing head provided with an upright journal bearing for receiving said steering post, means for resiliently supporting said bearing head on said steering wheel unit to permit the steering post to move vertically relatively to said journal bearing, and power-operated mechanism comprising an actuating arm splined to said steering post to effect rotation of the latter while permitting the same to move up and down along said journal bearing relatively to said actuating arm.

39. In steering apparatus for vehicles, the combination with a steering wheel unit comprising an upright steering post, of a supporting frame having a steering bearing head at its front end and provided with a journal bearing for receiving said steering post, a plate secured to said steering post, an inverted cup-shaped recess having upright walls for guiding the periphery of said plate, spaced-apart springs between said plate and said head, tubes on said plates surrounding said springs and adapted to limit the compression of the latter, an actuating arm splined to the upper portion of the steering post, and a reciprocating hydraulic motor having its ends connected to said frame and to said arm for rotating said steering post while said head is movable up and down within the limits permitted by said tubes.

40. A frame for a road-working machine comprising a pair of spaced-apart parallel flat side plates, transversely extending connecting means between said side plates, and inwardly extending vertically-spaced plates above and below transversely alined openings in the rear portions of said side plates, said inwardly extending plates being rigidly secured to the inner sides of said side plates to form receivers for springs interposed between the inner opposing faces of said inwardly extending plates and the upper and lower sides of an axle projecting through said openings.

41. In a road-working machine, the combination with a main frame, of a power traction unit comprising an engine connected to ground engaging wheels to drive the same, resilient means for supporting the rear end portion of said main frame on the rear end portion of said power traction unit, a road working implement carried by the rear end of said main frame, means connecting the forward end portion of said power traction unit to said main frame, resilient means between said main frame and said power traction unit to cushion upward thrusts of said road working implement when riding over obstructions in the roadway, a steering wheel unit at the front end of said main frame, and resilient means for supporting the front end of said main frame on said steering wheel unit and serving to co-operate with the aforesaid cushioning means to increase the extent of upward cushioned movement of the road working implement when riding over a relatively high obstruction in the roadway.

42. In a road roller, the combination with a main frame, of a traction unit comprising an engine operatively connected to ground engaging traction rollers rotatable on axes fixed relative to the body of the unit, a road working implement carried by the rear end of said main frame, means for resiliently connecting the rear end portion of said main frame to the rear end of said traction unit, resilient connecting mechanism between the front end of said traction unit and said main frame, a steering roller unit at the front end of said main frame, means for resiliently supporting the front end of said main frame on said steering roller unit, and means for adjusting said road working implement and operating said steering roller unit from an operator's station at the rear end portion of said main frame.

RAYMOND W. KEELER.